United States Patent [19]

Strait, Jr.

[11] Patent Number: 4,614,401
[45] Date of Patent: Sep. 30, 1986

[54] OPTICAL FIBER CONNECTOR

[75] Inventor: Ross W. Strait, Jr., Madison, Conn.

[73] Assignee: Times Fiber Communications, Inc., Wallingford, Conn.

[21] Appl. No.: 503,165

[22] Filed: Jun. 10, 1983

[51] Int. Cl.⁴ ............................................. G02B 6/38
[52] U.S. Cl. .............................. 350/96.21; 350/96.20
[58] Field of Search ................ 350/96.20, 96.21, 96.22

[56] References Cited

U.S. PATENT DOCUMENTS

| | | | |
|---|---|---|---|
| 4,019,241 | 4/1977 | Logan | 350/96.21 X |
| 4,047,796 | 9/1977 | Kao et al. | 350/96.21 |
| 4,050,781 | 9/1977 | Beauhaire | 350/96.21 |
| 4,056,305 | 11/1977 | McCartney et al. | 350/96.21 |
| 4,061,416 | 12/1977 | Stewart | 350/96.21 |
| 4,123,139 | 10/1978 | Sandahl | 350/96.21 |
| 4,161,347 | 7/1979 | Tardy | 350/96.21 |
| 4,217,031 | 8/1980 | Mignien et al. | 350/96.21 |
| 4,239,334 | 12/1980 | Johnson | 350/96.21 |
| 4,380,366 | 4/1983 | Franken et al. | 350/96.21 |
| 4,460,243 | 7/1984 | Strait, Jr. | 350/96.21 |
| 4,469,400 | 9/1984 | Hakoun | 350/96.21 |

FOREIGN PATENT DOCUMENTS

| | | | |
|---|---|---|---|
| 0028790 | 5/1981 | European Pat. Off. | 350/96.21 |
| 52-77736 | 6/1977 | Japan | 350/96.21 |
| 2019028 | 10/1979 | United Kingdom . | |
| 158061 | 11/1980 | United Kingdom | 350/96.21 |
| 1585766 | 3/1981 | United Kingdom . | |
| 1596227 | 8/1981 | United Kingdom . | |

OTHER PUBLICATIONS

"Optical Fiber Cables and Connectors for Mini-Hub" by Pinnow et al, Times Fiber Communications Inc., Spring 1982.

*Primary Examiner*—William L. Sikes
*Assistant Examiner*—Akm E. Ullah
*Attorney, Agent, or Firm*—Bacon & Thomas

[57] ABSTRACT

A device for connecting two optical fibers is disclosed. The connector enables two optical fibers to be coupled in a precise manner which minimizes losses at the connection interface and enables the ends of the optical fibers to be protected when the connection is severed.

7 Claims, 10 Drawing Figures

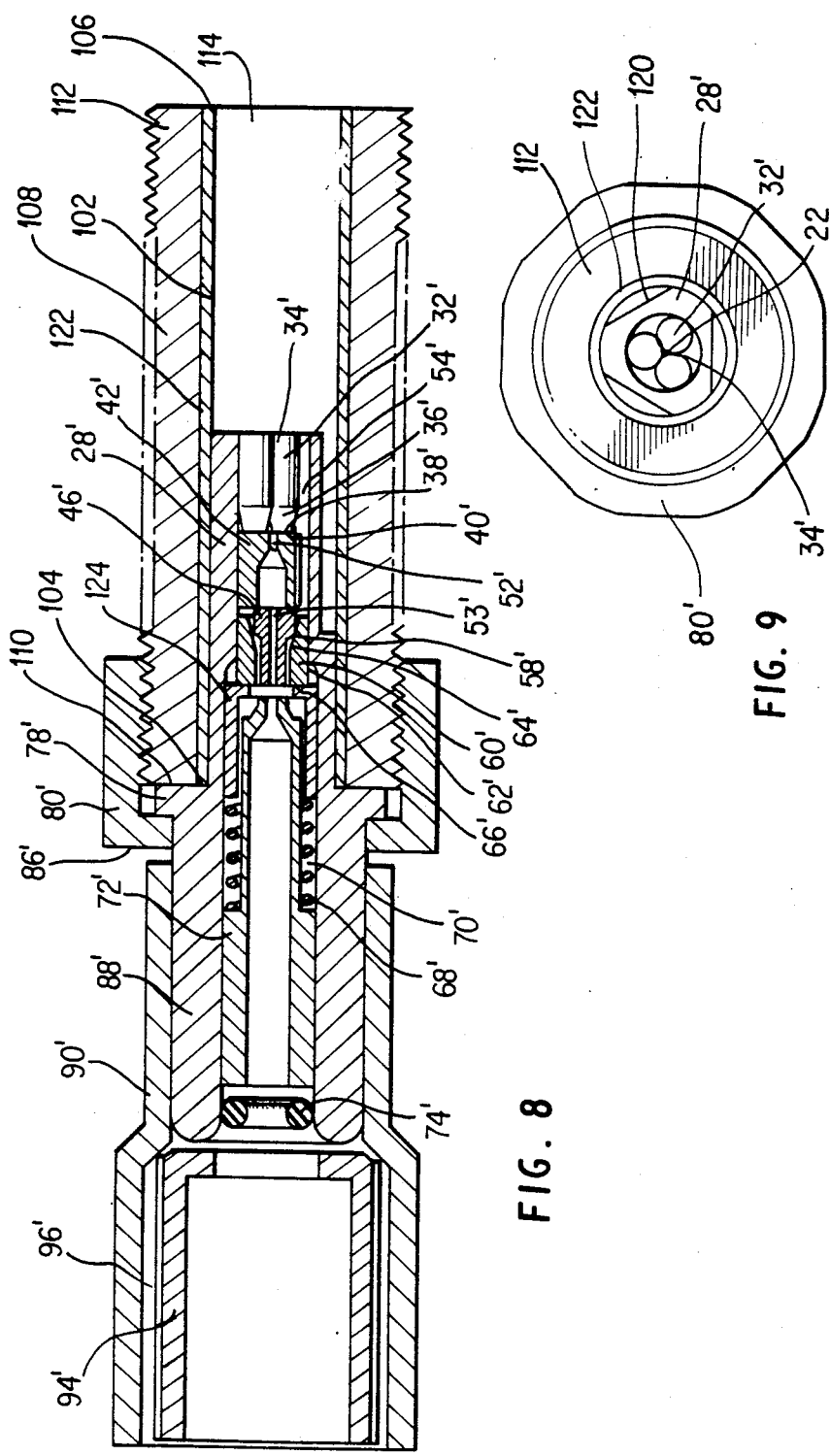

4,614,401

OPTICAL FIBER CONNECTOR

TECHNICAL FIELD OF THE INVENTION

This invention is directed to a connector for precision coupling of optical fibers.

BACKGROUND OF THE PRIOR ART

Optical fiber connectors are devices used to connect two or more optical fibers in a fiber optic transmission system. When two optical fibers are connected, attenuation of the optical signal at the connection inevitably occurs. To minimize this attenuation, a connector for optical fibers must precisely align the two fibers so that the axis of the transmitting fiber is coincident with the axis of the receiving fiber and the ends of each fiber are precisely adjacent to one another. The connector design must have means a preclude radial misalignment, angular misalignment and axial separation of the transmitting and receiving fibers. In addition to providing precise spatial alignment, the connector design must protect the glass fiber from mechanical stress, shock or other physical abuse during assembly, storage, mating and unmating, and usage.

It has been heretofore proposed to align and couple optical fibers in the interstice between three contiguous, elongated, cylindrical, rigid pins. For example in U.S. Pat. No. 4,047,796, a connector design is disclosed which employs three contiguous cylindrical rods of equal dimensions, through which two lengths of optical fiber are threaded from opposite ends in the interstice between the rods until they contact. The fibers are aligned and secured in position by means of a clamp which tightens a compression ring at one end of the rod assembly so that the rods engage and secure the fibers in alignment. Other patents, such as U.S. Pat. Nos. 4,061,416 and 4,050,781, disclose similar connectors predicated upon the three rod assembly.

One of the major disadvantages inherent in the three rod assemblies of the prior art, stems from the fact that connection and disconnection are accomplished by simply releasing the pressure on the rods and inserting or removing the naked optical fiber from the assembly. This procedure increases the potential for damage to the fragile glass fiber due to mechanical and physical stress while it is unprotected.

SUMMARY OF THE INVENTION

The present invention is directed to a connector for coupling two optical fibers in a precise manner that minimizes losses at the connection and that enables the ends of the optical fibers to be protected when the connection is separated.

The connector of the invention is comprised of two connector assemblies. Each connector assembly contains a three-pin sub-assembly to support the end portions of optical fiber that extend from the ends of the fiber optic cable to be coupled. Each three-pin sub-assembly comprises three parallel, contiguous, like-size pins that are precisely dimensioned so that when they are rigidly secured together in a contiguous relationship a precisely defined elongated chamber extends axially through the central space between the pins. Each end portion of optical fiber to be coupled extends through the respective chamber in each sub-assembly and terminates precisely at the proximal ends of the pins in each connector assembly.

The pins comprising each sub-assembly are rigidly secured together in a contiguous relationship to define the chamber for receiving a length of optical fiber in each connector assembly by first retaining means. Second retaining means is provided in each connector assembly for providing a stress relieving space adjacent to the distal ends of the three-pin sub-assembly. Spring-loaded retaining means is provided in each connector assembly to securely fix the axial position of each optical fiber within the chamber defined by the three pins in each sub-assembly.

The spring-loaded retaining means is preferably positioned in each connector assembly behind the second retaining means which abuts the distal ends of the three-pin sub-assembly. The combination of the first and second retaining means and the spring-loaded retaining means in each connector assembly insures that when two connector assemblies are brought together and coupled by their respective coupling means, the chambers within each sub-assembly are precisely axially, radially, and angularly aligned so that the optical fibers extending through each of the chambers are secured in precise alignment. A special tool is provided to release the optical fiber from the spring-loaded retaining means when it is desired to insert or remove the fiber into or from the connector assembly.

The invention, therefore, contemplates a connector structure for enabling the fiber supporting chambers in each sub-assembly to be accurately aligned and supported at the point where the fiber lengths terminate in endwise abutting relationship, while still permitting the connection to be readily and repeatedly separated and reconnected without disturbing the precise nature of the coupling between the ends of the optical fiber. In addition, by virtue of the special tool, which forms part of the invention, the optical fiber can be readily loaded and unloaded from the connector structure.

BRIEF DESCRIPTION OF THE DRAWINGS

FIG. 8 is a cross-sectional view of a female connector assembly for mating with the connector assembly shown in FIGS. 6 and 7;

FIG. 9 is an end view of the connector assembly shown in FIG. 8;

DETAILED DESCRIPTION OF THE PREFERRED EMBODIMENTS

Figure 1:
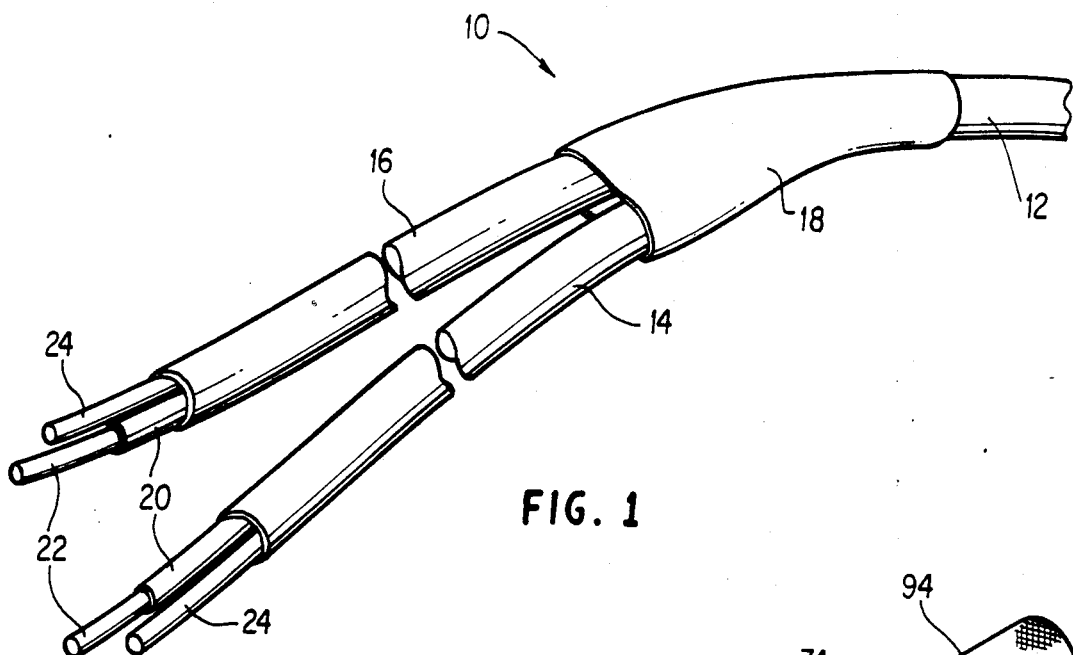
FIG. 1 is a perspective view of a fiber optic cable with various sections of its protective sheaths removed.

Referring to FIG. 1, reference numeral 10 shows, in general, a fiber optic cable which has been prepared for use in conjunction with a connector assembly of the invention. The cable 10 has a first protective sheath 12, which encloses a plurality of fiber optic cables. The protective sheath is typically made from a thermoplastic polymeric material. In partial preparation for inserting one of the optical fibers into a connector assembly, as explained below, a portion of the first protective sheath 12 has been stripped away and a brass sleeve element 18 has been positioned so that one end of the element 18 is in contact with the first protective sheath 12 and the opposite end of the element surrounds the ends of second protective sheaths 14 and 16 which are installed for individual protection of the optical fibers during the connector installation. Interiorily of the protective sheaths 14 and 16 are strength members 24, one for each fiber optic cable. The strength members are typically metallic such as steel, but may also be made from polymeric materials. The strength members 24 are colinearly aligned with optical fiber 22 in order to provide strength and rigidity to the arrangement and protect the fragile glass fiber. The optical fibers 22 are further enclosed by a protective buffer layer 20.

A basic element of a connector assembly of the invention comprises three, like-size, contiguous, rigid pins referred to as a three-pin sub-assembly. The pins are held in position in a connector assembly by first retaining means. The first retaining means for the pins is preferably a rigid, generally cylindrical shaped metal sleeve which surrounds the pins and secures them in a tight, contiguous relationship by exerting a radially compressive force on the pins. The second retaining means is preferably a rigid metal bushing shaped and positioned so as to provide a stress relieving space for the optical fiber adjacent to the distal ends of the three-pin sub-assembly. There are one three-pin sub-assembly and first and second retaining means in each connector assembly in the invention. Two connector assemblies are coupled together to connect the ends of two optical fibers.

In each connector assembly, the optical fiber is fitted into the intersticial chamber between the three pins of the sub-assembly. The diameter of the chamber is defined by the diameter of the inscribed circle tangent to the circumference of each of the three pins. Because the diameter of the chamber is determined by the diameter of the pins, any diameter optical fiber can be accommodated by careful selection of the diameter of the pins.

Spring-loaded retaining means, preferably in the form of a spring-biased sliding ring surrounding three rigid, generally arcuate shaped collect sectors, is provided in each connector assembly for securing the optical fiber within the intersticial chamber by preventing axial movement of the fiber within the chamber.

Each connector assembly additionally contains coupling means which enables it to be securely coupled to a mating connector assembly in such a manner that the proximal ends of each three-pin sub-assembly are precisely aligned. Additionally, each connector assembly may contain means to thread the optical fiber into the sub-assembly and to hold and protect the retaining means.

Figure 2:
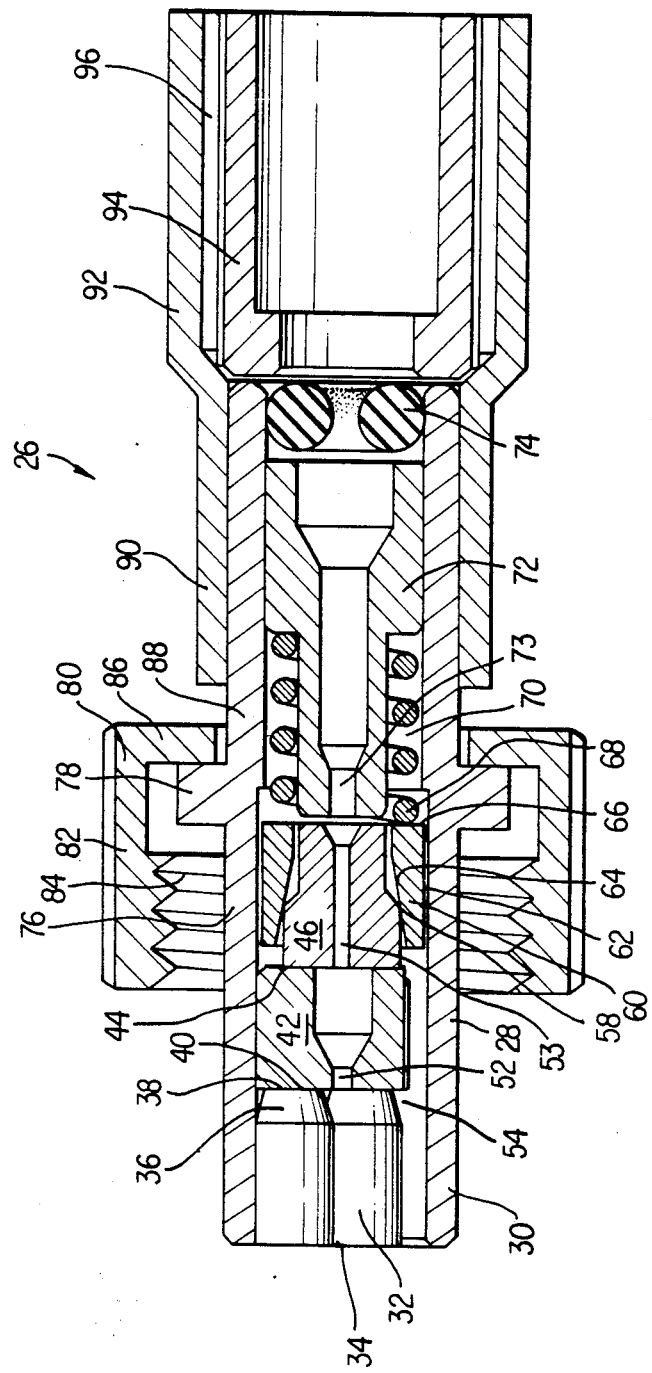
FIG. 2 is a cross-sectional view of a male connector assembly designed in accordance with the invention.

FIG. 2 shows a connector assembly of the invention, generally at 26. A metal sleeve 28 is provided with a front portion 30 for housing and retaining a three-pin sub-assembly 32 which defines an intersticial chamber 34 for receiving and protecting an optical fiber inserted therein. The proximal ends of the pins are set flush with each other and with the end of the front portion 30 of metal sleeve 28. The distal end 36 of each pin is tapered so as to assist in guiding the optical fiber 22 when it is threaded into the connector through the intersticial chamber 34. The end face 38 of at least one pin of the three-pin sub-assembly 32 is in a flush, abutting arrangement with a first end face 40 of three-pin lead in bushing 42. The other end face 44 of the three-pin lead in bushing is in flush, abutting relationship with three collect sectors 46.

Figure 3:
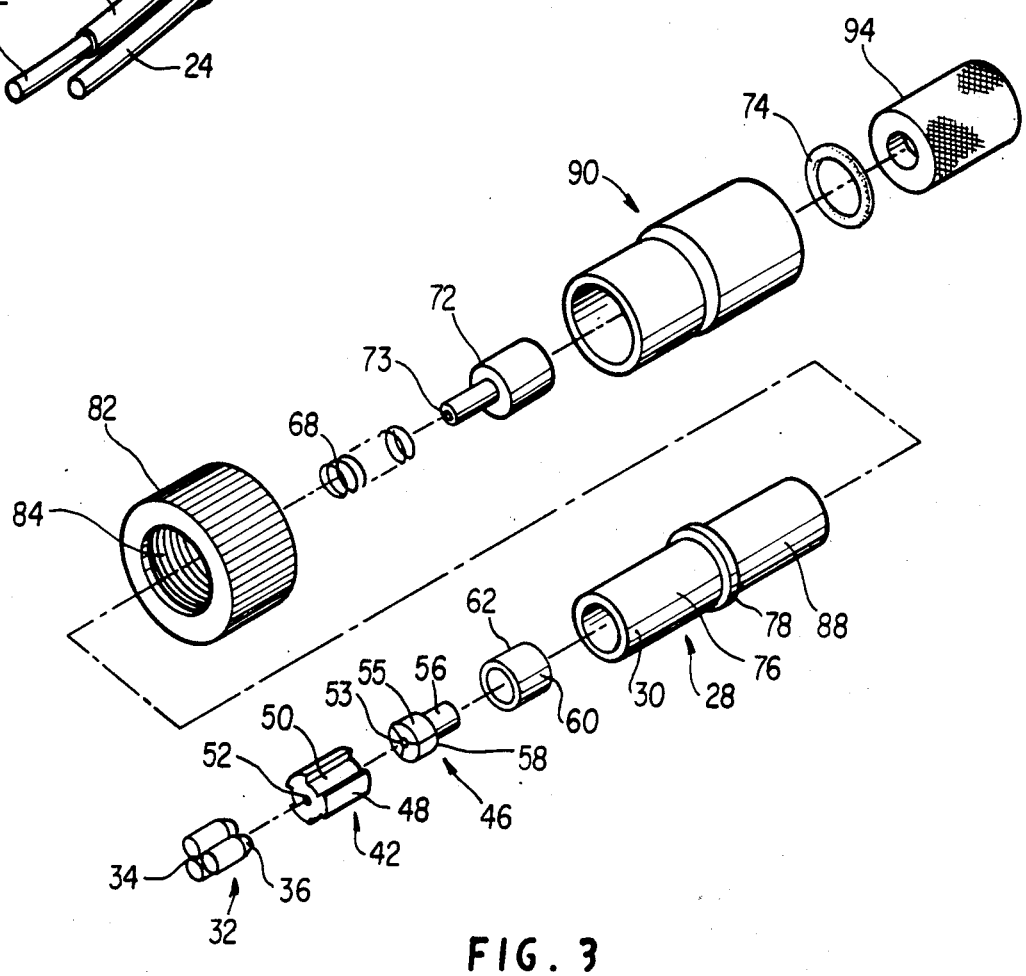
FIG. 3 is an exploded view of the connector assembly shown in FIG. 2.

Referring to FIG. 3, the three-pin lead in bushing 42, is shown to be generally cyindrically shaped with three arcuate-shaped flanges 48 protruding longitudinally along the circumference 50 of the bushing at angles of 120°. The center of the bushing 52 is hollow to provide a chamber for passage of the optical fiber. The diameter of the center is larger than the diameter of the optical fiber to aid in relieving stresses on the fiber.

The three-pin lead in bushing is positioned in the connector assembly shown in FIG. 2, such that each flange 48 is press fitted against metal sleeve 28 and is flush against one of the pins 32 in the three-pin sub-assembly. This results in three passages 54 bounded by metal sleeve 28, pins 32 and the circumference of the three-pin lead in bushing 50. These passages provide access to the inner portion of the connector assembly for releasing the optical fiber, as described hereinafter.

Referring again to FIG. 3, the collect sectors 46 are shown to be three identical, rigid metal bodies which are arcuate in cross-section, defining an arc of slightly less than 120°. Each sector contains a longitudinal groove 53 at the center of the arc which defines the passageway for the optical fiber when the sectors are assembled contiguously as shown in FIG. 3. The sectors further comprise front portion 55 and rear portion 56. Front portion 55 is of a larger diameter than rear portion 56, thereby forming shoulder 58.

In the connector assembly shown in FIG. 2, the collect sectors are placed in contiguous arrangement so that longitudinal groove 53 aligns with passages 34 and 52 through the three-pin sub-assembly and three-pin lead in bushing. The sectors are disposed within sliding ring 60, the outer surface of which 62 is in sliding engagement with the inner surface of metal sleeve 28. The inner surface 64 of the sliding ring is tapered and in sliding engagement with shoulder 58 of the collect sectors. The base of the sliding ring 66 is in contact with spring 68 which is disposed within a cavity 70 defined by metal sleeve 28 and the front portion of bushing 72 which is smaller in diameter than the rear portion of this bushing. Bushing 72 is provided with a central longitudinal cavity 73 which aligns with the cavity formed by grooves 53 in the adjacent collect sector assembly. The rear portion of bushing 72 is press fitted within metal sleeve 28 and supported by an elastomeric O-ring which is also press fitted into metal sleeve. In this state, spring 68 pushes against the base of the sliding ring 66, driving the ring forward in sliding engagement with shoulders 58 of the collect sectors 46. Because the inner wall of the ring 64 is tapered and gradually thickens toward base of the ring, and because the rear face of the three-pin lead in bushing limits forward movement of collect sectors, the collect sectors are forced radially inward as the ring slides forward. This causes the diameter of passage 53 to be reduced until it equals the outer diameter of the optical fiber. The collect sectors, thus, clamp down on the optical fiber and are held in this position by the force of the spring on the sliding ring. In this manner, the optical fiber is held in place within the connector assembly.

The metal sleeve 28 has a forward end portion 76 which extends rearwardly to an increased diameter portion 78 which extends circumferentially outwardly and serves as a stop member for a coupling nut 80. The coupling nut 80 has a front cylindrical portion 82 provided with internal threads 84 adapted to threadedly engage a threaded member of a mating connector assembly, as explained hereinafter. The rear portion of the coupling nut has a downwardly extending flange 86, an inner face of which will contact the upwardly extending shoulder 78 of the sleeve 28 so as to limit axial movement of the nut 80 towards the front face 76 of the sleeve 28. A reduced diameter portion of the sleeve 88 extends rearwardly from the shoulder 78 and is received within crimp sleeve 90. The front portion of the crimp sleeve 90 is of slightly smaller inside diameter than the outside diameter of the reduced portion 88 of the sleeve 28 so that the sleeve can be tightly press fitted within the front portion of the crimp sleeve.

The remainder of the crimp sleeve 92 is of a larger diameter to accommodate crimp ferrule 94 and provide annular space 96 therebetween which is designed to receive one or more strength members such as the steel strength member 24 of the optical fiber cable depicted in FIG. 1 in the manner described below.

Figure 4:
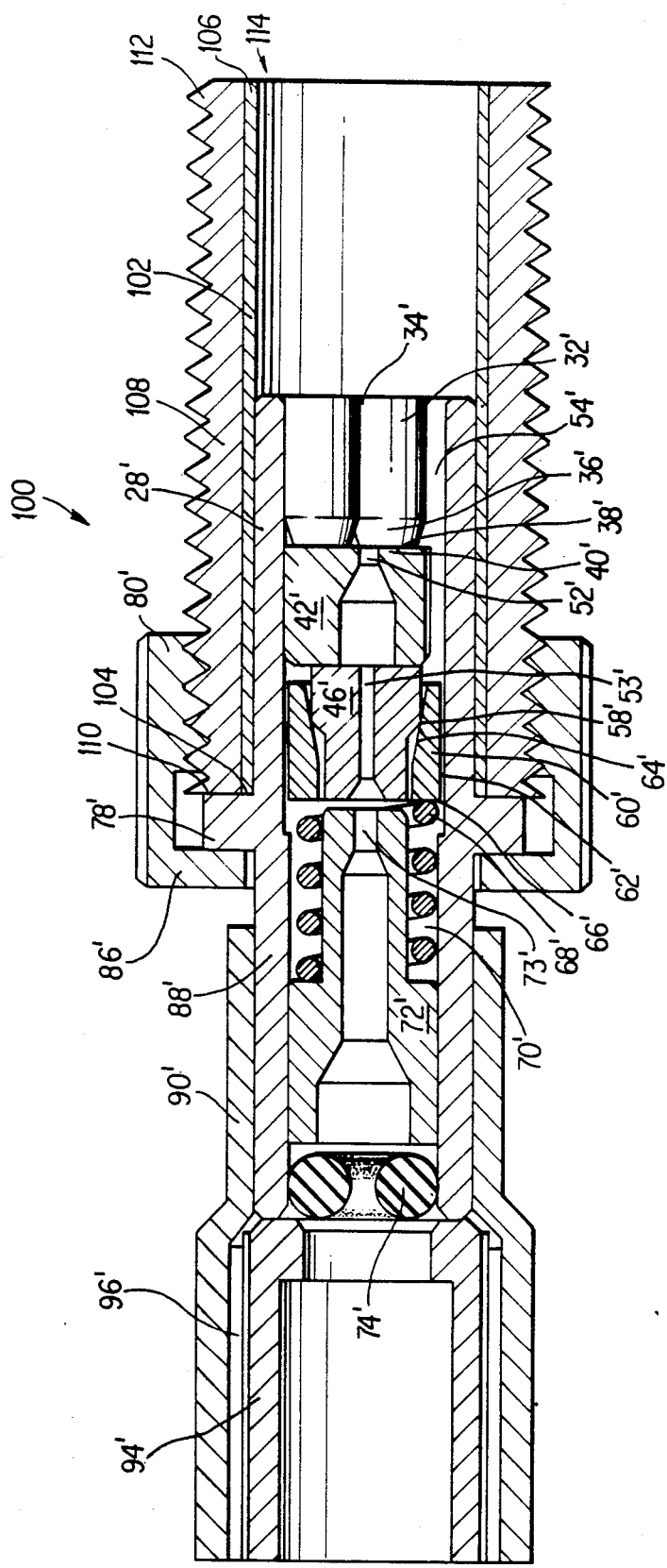
FIG. 4 is a cross-sectional view of a female connector assembly for mating with the connector assembly shown in FIGS. 2 and 3.

FIG. 4 depicts, in cross-section, the mating connector assembly, generally at 100. Reference may be made to the foregoing discussion of FIGS. 2 and 3 for a description of like parts and elements which will be designated by the same reference numeral as shown in FIGS. 2 and 4 with a prime (') designation. Accordingly, the discussion of FIG. 4 is limited to those parts and elements which differ in structure and/or function from those described with respect to FIGS. 2 and 3.

Concentric with sleeve 28' is an alignment sleeve 102. The alignment sleeve 102 is adapted to receive the sleeve 28 of the connector assembly shown in FIG. 2 in order to position two separate three-pin sub-assemblies, each housing an optical fiber, in precise alignment. A first end portion 104 of the alignment sleeve 102 abuts the shoulder portion 78' of the sleeve 28'. A second end portion 106 is provided with an opening for receiving the sleeve 28 of the mating connector assembly. Concentric with the alignment sleeve 102 is a threaded coupling 108. The coupling 108 is threadedly engaged with the coupling nut 80', until a first end portion 110 contacts the shoulder 78' of the sleeve 28'. A second end portion 112 is provided with an opening 114 for receiving the sleeve 28 of the mating connector assembly and for allowing access to the alignment sleeve 102 when the two connector assemblies are engaged.

Figure 5:
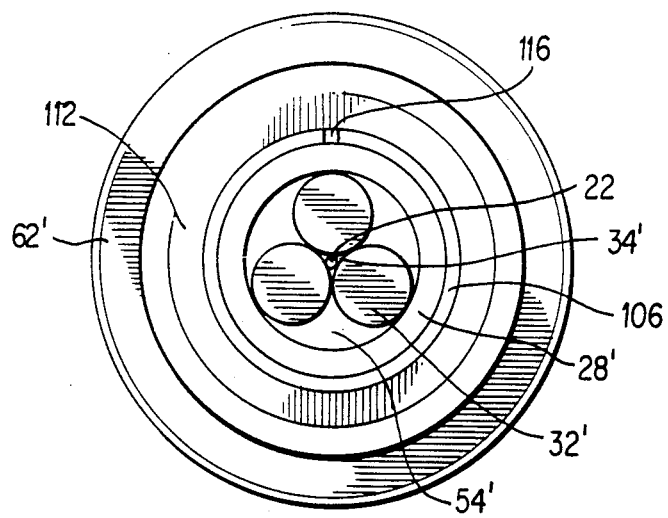
FIG. 5 is an end view of the connector assembly shown in FIG. 4.

FIG. 5 is an end view, looking to the left of the connector assembly 100 shown in FIG. 4. FIG. 5 shows the compact, concentricity of the connector assembly with optical fiber 22 situated in the intersticial space 34' provided by three-pin sub-assembly 32'. Passages 54' provide access to the top of the sliding ring 60' for releasing the optical fiber as described below. Also shown in FIG. 5 is the split, expansion area 116 of the alignment sleeve 106.

When the optical fibers have been accurately positioned by each connector assembly 26 and 100, the assemblies may be joined so as to accurately align the disparate ends of each optical fiber. This step is achieved by coupling assembly 100 to assembly 26 by sliding sleeve 28 of assembly 26 into the alignment sleeve 102 of assembly 100. Sleeve 28 is received with alignment sleeve 102 until the proximal end portion of sleeve 28 abuts the proximal end portion of sleeve 28'. At the same time, the threaded coupling 108 is in engagement with the threads of coupling nut 80 of assembly 26. Coupling nut 80 continuously advances the threaded coupling 108 until the proximal end portion of sleeve 28' bottoms against the proximal end portion of sleeve 28 in assembly 26. Due to the precision of each assembly 26 and 100, each optical fiber is then aligned with minimal optical loss.

FIGS. 6-9 show a further embodiment of the invention in the form of connector assemblies adapted to connect small diameter optical fiber, that is, optical fiber having an outer diameter of 125 microns or less. In these figures, many of the parts correspond to parts shown and described with respect to FIGS. 2-5 except that they are proportionally smaller. Accordingly, the same reference numerals have been used as in FIGS. 2-5 for like parts and only the aspects of the connector assemblies which are different will be dicussed in detail.

As shown in FIGS. 6-9, in order to adapt the connector to receive small diameter optical fibers, two modifications of the embodiments of the invention shown in FIGS. 2-5 are preferably made. First, the front end portion of the sleeve 28 is provided with flat areas 120. This permits a tubular alignment sleeve 122 to be used in the female connector assembly shown in FIGS. 8 and 9 without a longitudinal expansion split. This results in more precise alignment by the alignment sleeve which is important for coupling small diameter optical fibers. Second, a back sliding ring 124 is disposed within sleeve 28 between the front face of spring 68 and the base of the sliding ring 66. The back sliding ring is used to accommodate the fact that the sliding ring has a small diameter than the spring. In all other respects, the connector assemblies shown in FIGS. 6-9 correspond in parts and function to the assemblies pictured in FIGS. 2-5.

Figure 10:
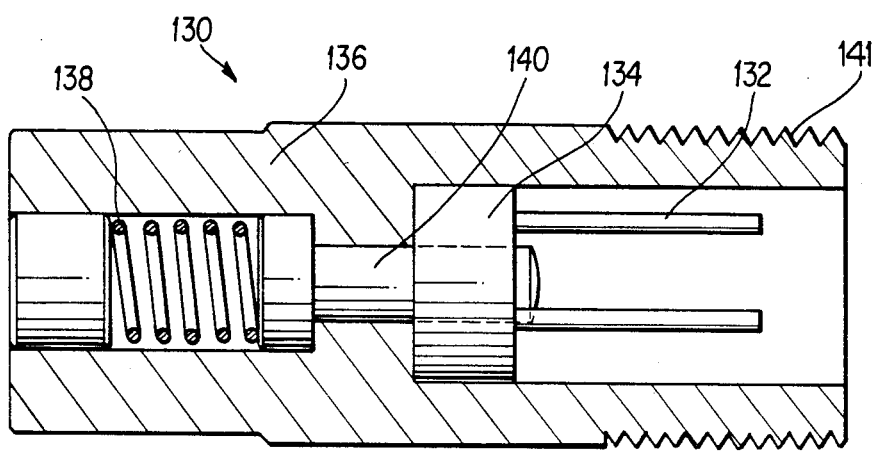
FIG. 10 is a cross-sectional view of a tool designed to release the spring-loaded retaining means of connector assemblies designed in accordance with the invention.
Figure 6:
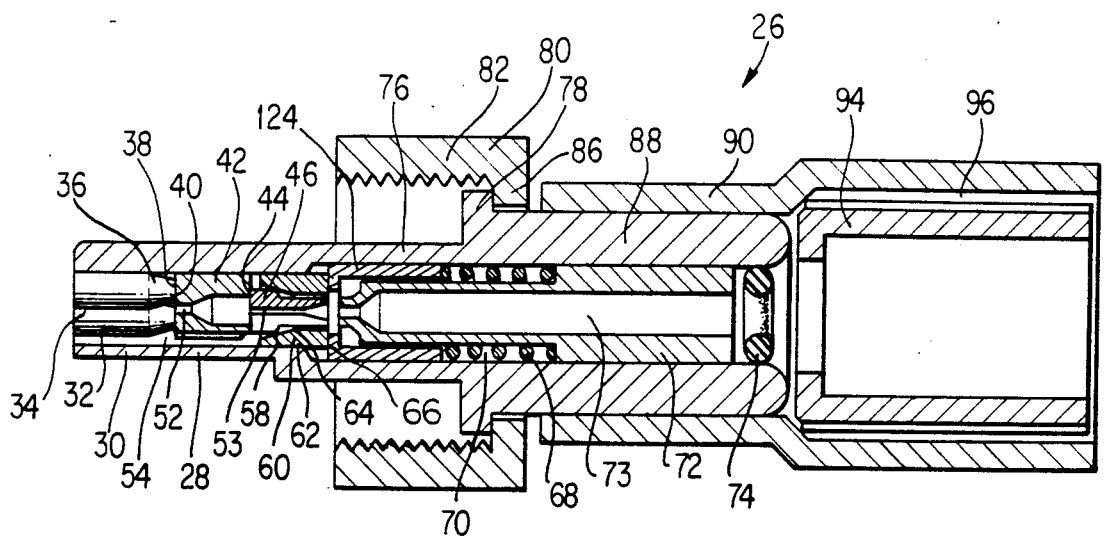
FIG. 6 is a cross-sectional view of another male connector assembly designed in accordance with the invention.
Figure 7:
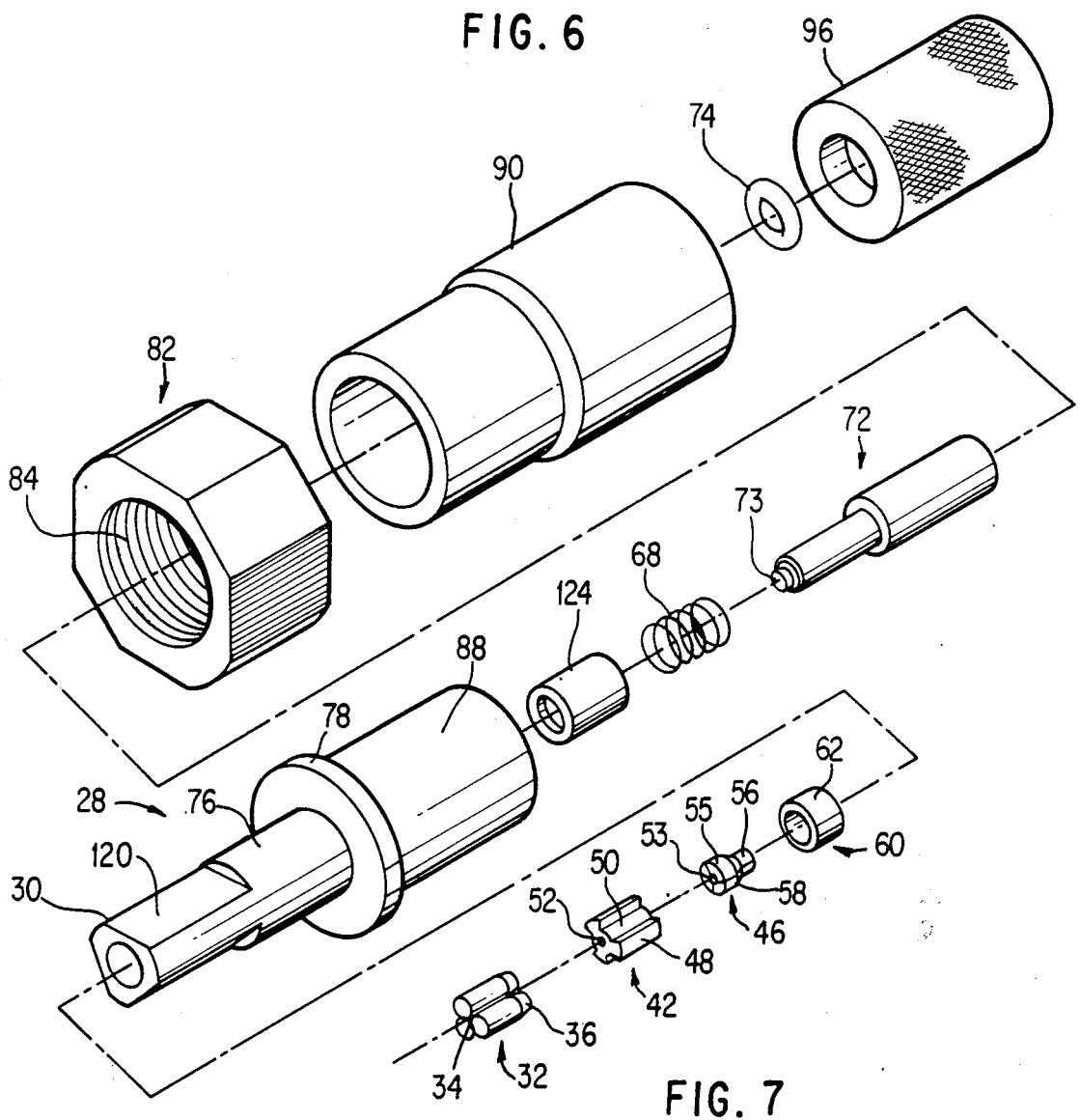
FIG. 7 is an exploded view of the connector assembly shown in FIG. 6.

FIG. 10 shows a tool designed to open the spring-loaded retaining means formed by the collect sectors, sliding ring and spring so that an optical fiber may be inserted into or removed from a connector assembly. The essential elements of the tool 130 are one or more prongs 132 protruding from a flat washer 134. The prongs are sized, shaped and positioned on the washer 134 so that they can be inserted into a connector assembly from the front so that the prongs enter the three interstices 54 between the three-pin sub-assembly and three-pin alignment bushing and sleeve (see FIG. 2). The tool is preferably disposed within a housing 136 which may be provided with a spring 138 and sliding stop 140. The housing 136 has threads 141 which engage the coupling nut 80 on assembly 26 as the tool 130 is installed onto assembly 26. The prongs 132 are pushed against the sliding ring 60 by the housing 136.

In use, the prongs extend into the front of the connector past the three-pin subassembly and three-pin lead in bushing until they contact the forward surface of the sliding ring. When the tool is pressed further into the connector, the sliding ring is pushed back, thereby removing the radial force on the collect sectors and expanding the passageway formed by groove 53 so that an optical fiber can be freely removed therefrom or inserted therethrough. When an optical fiber has been positioned in the connector assembly with the collect sectors loose, the clamp mechanism is reactivated by withdrawing the three-pronged tool from the front of the connector. Without the counter force of the three-pronged tool, the spring 68 pushes the sliding ring forward, driving the collect sectors forward until they abut the rear surface of the three-pin lead-in bushing and then radially inward against the optical fiber. The spring 138 and sliding stop 140 comprise means which locate the end of the fiber 22 very slightly recessed behind the proximal end of the three-pin sub-assembly 32, even as the tool 130 is being withdrawn from the connector assembly.

The spring face, the tapered angle of the inner wall of the sliding ring, the radius of the longitudinal groove in the collect sector which contacts the optical fiber, the length of the collect sectors and the coefficient to friction between the collect sectors and the glass fiber may be adjusted to create a retention force sufficient to hold optical fiber of a variety of diameters in place in the connector assembly without creating sufficient stress to break the fiber.

In order to prepare optical fiber 10 of FIG. 1 for connection with the assemblies 26 and 100 of FIGS. 2 and 5, respectively, the following procedure is preferred. Cable 12 is first cut so that an end face (not shown) is prepared with all components flush with each other. The outer protective sheath is removed over a predetermined length exposing the buffered optical fibers 22 and the cable strength members 24. The brass sleeve element 18 is installed over the fibers and strength members and is pushed onto the cable until the end of the protective sheath 12 hits a stop inside the brass sleeve element. A pre-formed V-shaped tube is installed with one fiber and one strength member passing through each leg of the V-shaped tube. The tube is pushed on until it bottoms against a stop in the brass sleeve element 18, as shown in FIG. 1. The legs of the V-shaped tube are shown as protective sheaths 14 and 16 in FIG. 1. The length of protective sheaths 14 and 16 is predetermined so that the appropriate length of buffered fiber and strength member protrudes from each protective sheath 14 and 16.

Each optical fiber is now ready for connection to a connector assembly. For ease of explanation, the connection will be described with reference to optical cable element 14 and connector assembly 26 shown in FIG. 2 since it is understood that an identical procedure is employed to connect optical cable element 16 and any number of other optical cable elements with a connector assembly.

A crimp ferrule 94 is positioned over the end of cable element 14 with buffered optical fiber 22 and strength member 24 protruding through it. The strength member 24 is then bent back over the outer surface of the crimp ferrule 94. The buffered optical fiber is coated with a protective silicone grease. This grease is removed from the exposed fiber by wiping it off and cleaning the wiped surface of the fiber with a solvent. All but a short length of the exposed buffer 20 is removed from the fiber. The fiber is cleaved at a predetermined length. Tool 130 is installed onto assembly 26 by threadedly engaging the end of tool housing 136 into coupling nut 80 with care to guide the prongs 132 into the interstices 34 as previously described.

The prepared optical fiber 22 is inserted into the connector assembly, onto which tool 130 has been installed, by guiding it through the opened end of the crimp sleeve 92 and the O-ring 74. The fiber is pushed into the connector assembly until the crimp ferrule on the end of the protective sheath 14 bottoms against the distal end of sleeve 28 as illustrated in FIG. 2. The end of the optical fiber has now been fed through passages 73, 53, 52, and 34, and the stop tool 140 positions the end of the fiber very slightly recessed behind the proximal end of the three-pin sub-assembly. The end of the optical fiber rests against stop tool 140 because of the predetermined length to which it was cleaved.

The tool 130 is removed from the connector assembly by threadedly disengaging the coupling nut 80 from the tool housing 136. This withdraws the spring-actuator prong(s) 132 and allows the collect sectors to clamp down on the optical fiber as previously described. The axial location of the optical fiber is in this manner fixed relative to the connector assembly.

To complete the connection of the connector assembly 26 to the fiber optic cable, the large end of the crip sleeve 92 is crimped onto the crimp ferrule 94, thereby capturing the cable strength member 24 and insuring a rugged optical splice.

A separate optical cable may be similarly positioned within the connector assembly 100 of FIG. 5 and the two assemblies 26 and 100 may then be joined to provide an optical fiber connector which connects two fiber optical cables with minimal optical loss, e.g., about 2 db or less.

While the present invention has been described in terms of certain preferred embodiments, one skilled in the art will readily appreciate that various modifications, changes, omissions and substitutions may be made without departing from the spirit thereof. It is intended, therefore, that the present invention be limited solely by the scope of the following claims.

I claim:

1. A connector for coupling the ends of two lengths of optical fiber in contiguous, aligned position comprising two connector assemblies, each connector assembly comprising:
   (a) a three-pin sub-assembly comprising three like-size, generally cylindrical, rigid pins extending parallel to each other in contiguous relationship, said pins having a diameter such that an inscribed circle extending tangent to the pin circumferences in the interior space between the pins substantially corresponds to the diameter of a length of optical fiber;
   (b) first retaining means for securely retaining the pins of the sub-assembly in contiguous relationship, the interior space extending between the circumferences of the pins defining a chamber for receiving a length of optical fiber;
   (c) second retaining means for providing a stress relieving space for the optical fiber adjacent to the distal end of the three-pin sub-assembly;
   (d) spring-loaded retaining means for securing an optical fiber within the chamber defined by the three pins of the sub-assembly by exertion of a radial compressive force on said optical fiber; and
   (e) coupling means for connecting the connector assembly to its mating connector assembly.

2. A connector according to claim 1, wherein said first retaining means comprises a rigid metal sleeve circumferentially surrounding said pins and exerting a radial compressive force on said pins.

3. A connector according to claim 1, wherein said second retaining means comprises a bushing having a first end portion in abutting relationship with the distal end of at least one of said pins.

4. A connector according to claim 1, wherein said spring-loaded retaining means comprises three like-size, arcuate shaped, rigid bodies extending parallel to each other in contiguous relationship, each of said bodies having a longitudinal groove running along the center of the arc defined by the body, thereby forming a central cylindrical longitudinal opening between said bodies and having a shoulder extending around the circumference of the body, said bodies being disposed within a spring-biased sliding ring which exerts a radial compressive force on the shoulders of said bodies forcing them radially inward.

5. A connector according to claim 1, wherein one of said two connector assemblies further comprises alignment means concentric with said first retaining means.

6. A connector according to claim 5, further comprising threaded coupling means circumferentially surrounding and concentric with said alignment means, said threaded coupling means being adapted to be threadedly engaged with mating coupling means of said other connector assembly.

7. A connector according to claim 1, wherein said spring-loaded retaining means is positioned in each connector assembly behind the second retaining means which abuts the distal ends of the three-pin sub-assembly.

* * * * *